US012771897B2

(12) United States Patent
Meissner

(10) Patent No.: US 12,771,897 B2
(45) Date of Patent: Oct. 20, 2026

(54) MEDIA PLAYBACK SYNCHRONIZATION ON MULTIPLE SYSTEMS

(71) Applicant: Charter Communications Operating, LLC, St. Louis, MO (US)

(72) Inventor: Jeremy P. Meissner, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 6 days.

(21) Appl. No.: 18/946,200

(22) Filed: Nov. 13, 2024

(65) Prior Publication Data

US 2026/0136061 A1 May 14, 2026

(51) Int. Cl.

| | |
|---|---|
| ***H04N 21/43*** | (2011.01) |
| ***H04N 21/439*** | (2011.01) |
| ***H04N 21/44*** | (2011.01) |
| ***H04N 21/81*** | (2011.01) |

(52) U.S. Cl.

CPC ..... *H04N 21/43079* (2020.08); *H04N 21/439* (2013.01); *H04N 21/44008* (2013.01); *H04N 21/812* (2013.01)

(58) Field of Classification Search

None

See application file for complete search history.

(56) References Cited

U.S. PATENT DOCUMENTS

2022/0408146 A1* 12/2022 Vyhmeister ...... H04N 21/41415
2023/0046493 A1* 2/2023 Frey ....................... G06V 20/42

* cited by examiner

*Primary Examiner* — Omar S Parra

(74) *Attorney, Agent, or Firm* — Armis IP Law, LLC

(57) ABSTRACT

A system includes a primary playback system and a secondary playback system. The primary playback system receives primary content including multiple segments of content for playback. The multiple segments of content may include a first segment of content modified by a video analyzer resource to include a supplemental audio signal. During playback of the first segment of content, the primary playback system plays back both an original audio signal associated with the first segment of content and the supplemental audio signal. The supplemental audio signal support synchronization of the secondary playback system with the primary playback system.

35 Claims, 12 Drawing Sheets

MEDIA PLAYBACK SYNCHRONIZATION ON MULTIPLE SYSTEMS

BACKGROUND

Conventional systems support playback of an audio file associated with a movie viewed in a movie theater or other setting. For example, a moviegoer can select an audio file associated with a movie being played in the movie theater. The moviegoer downloads the audio file to a mobile communication device.

During playback of the movie, via detected audio associated with the movie played back in the movie theater, a conventional application executed on the mobile communication device determines a portion (or playback location) of the movie currently being played back in the theater. The conventional application on the mobile communication device then plays back portions of the audio file (or text file as the case may be) pertinent to the current played back portion of the movie.

BRIEF DESCRIPTION OF EXAMPLES

Examples herein provide novel ways of synchronizing playback of supplemental media on a secondary playback system with respect to playback of selected content played back on a primary playback system.

For example, to support synchronization as discussed herein, a video analyzer resource: receives primary content including multiple segments of content encoded for playback on a primary playback system, where a first segment of the multiple segments of content including an image portion and an audio portion for playback by the primary playback system. The video analyzer resource modifies the audio portion of the first segment of content to include a supplemental audio signal. Subsequent playback of the supplemental audio signal controls synchronization of a secondary playback system with respect to the primary playback system.

In a further example, a media playback system includes the primary playback system and the secondary playback system. The secondary playback system is disparately or separately located with respect to the primary playback system. In one scenario, a first user selects a specific title of content for playback by the primary playback system. The secondary playback system is operated nearby the primary playback system. The secondary playback system receives notification of the selection of the content to be played back on the primary playback system and downloads supplemental media as specified by the notification to the secondary playback system. Alternatively, the secondary playback system retrieves the segments of the supplemental media via use of a manifest file.

Via playback control supplied from the first user, the primary playback system plays back the title of content selected by the user. The secondary playback system, monitors progress of the primary playback system playing back the selected content via the supplemental audio signal. In one example, detected progress of playing back the title of content on the primary playback system is determined via monitoring the supplemental audio signal played back by the primary playback system. In other words, the supplemental audio signal may be added to the first segment of primary content to produce a respective audible signal (potentially inaudible to the human ear) when the first segment of primary content is played back by the primary playback system. The playback of the respective audible signal provides a synchronization notification to the secondary playback system.

The secondary playback system monitors the progress of the primary playback system playing back primary content via the supplemental signal. Based on detected progress, a playback management application (such as in or with the secondary playback system) synchronizes playback of supplemental media (such as descriptive audio, closed caption text, etc.) associated with the content on the secondary playback system operated by a user. In other words, the playback of the supplemental media on the secondary playback system is configured to track playback of the title of content on the primary playback system.

As further discussed herein, note that the audio portion of the first segment of content can be configured to include an original audio signal prior to the modifying. Modification of the audio portion of the first segment of content may include: producing the modified audio portion of the first segment of content to include a combination of the original audio signal and the newly added supplemental audio for playback by the primary playback system. The original audio signal may be encoded via at least one audible frequency that is audibly detectable by a user operating the primary playback system. The supplemental audio signal may be encoded via at least one frequency that is not audibly detectable by the user operating the primary playback system. Accordingly, the playback of the supplemental audio signal does not audibly interfere with playback of the original audio signal.

Still further examples as discussed herein include a video analyzer resource or other suitable entity encoding the supplemental audio signal to play back at an audible frequency greater than a threshold of human hearing. Thus, as previously discussed, playback of the supplemental audio signal does not audibly interfere with playback of the original audio signal.

Yet further examples as discussed herein include, at the video analyzer resource: receiving advertisement information indicating timing associated with playback of a first advertisement amongst the multiple segments of content in the primary content; via the advertisement information, detecting that the first advertisement is scheduled for playback between the first segment of the multiple segments of content and a second segment of the multiple segments of content; and modifying the audio portion of the first segment of content in response to detecting that the first advertisement is scheduled for playback between the first segment and the second segment of the multiple segments of content.

As previously discussed, playback of the supplemental audio signal in the modified audio portion of the first segment of content can be configured to indicate a start time of the first advertisement. Modification of the second segment of content may further include producing a modified audio portion of a second segment of the primary content to include a second supplemental audio signal, where playback of the second supplemental audio signal is also operative to control synchronization of the secondary playback system with respect to the primary playback system. In one example, playback of the second supplemental audio signal in the audio portion of the second segment of content may indicate a stop time of the first advertisement and corresponding restart a playback of primary content by the primary playback system.

In further examples, the secondary playback system is configured to playback secondary content, where the secondary content includes an audio description of images encoded for playback in the primary content. Synchronization of the secondary playback system with respect to the primary playback system may further include: synchronization of playback of the audio description of images (such as secondary content) on the secondary playback system with respect to playback of the primary content on the primary playback system.

Additional examples as discussed herein include implementation of a primary playback system. The primary playback system receives primary content including multiple segments of content for playback, where the multiple segments of content include a first segment of content modified by a video analyzer resource to include a supplemental audio signal. During playback of the first segment of content, the primary playback system plays back both an original audio signal associated with the first segment of content and the newly added supplemental audio signal (such as an audible synchronization control signal). The supplemental audio signal can be configured to include or be encoded to include any suitable information to synchronize the playback of secondary content on the secondary playback system.

In accordance with further examples, playback of the first segment of content on the primary playback system may include, via the primary playback system: audibly playing back an audio portion of the first segment of content via a sound generating system, where the audio portion is encoded to include the original audio signal and the supplemental audio signal; and visually playing back an image portion of the first segment of content on a display screen of the primary playback system, the image portion encoded to include images associated with the first segment of content.

As previously discussed, playback of the original audio signal via the sound generating system (sound speaker) of the primary playback system may be audibly detectable by a user operating the primary playback system; and the played back supplemental audio signal by the sound generating system may not be audibly detectable by the user operating the primary playback system. In other words, the played back supplemental audio signal (sound) may be generated at an audible frequency greater than a threshold of human hearing. However, the audible frequency of the supplemental audio signal is detectable by a respective sensor device monitoring for presence of the supplemental audio signal. If desired, the supplemental audio signal can be encoded to include a control command of any number of data bits, where the control command indicates how to control operation of the secondary content at the secondary playback system.

Note further that the segments of content associated with the primary content can be configured to include a second segment of content. In such an instance, the supplemental audio signal associated with the first segment of content can be configured to indicate timing of playing back a first advertisement played back on the primary playback system, where the first advertisement is scheduled for playback on the primary playback system between playback of the first segment of content and the second segment of content. Additionally, it is noted that the supplemental audio signal in the audio portion of the first segment of content may be encoded with a signature or data information to notify a secondary playback system of a start time of the first advertisement.

In still further examples, the supplemental audio signal may be a first supplemental audio signal. Note further that an audio portion of the second segment of content may be modified to include a second supplemental audio signal, where playback of the second supplemental audio signal (such as a first signature tone) by the primary playback system is operative to control synchronization of the secondary playback system with respect to the primary playback system.

Playback of the second supplemental audio signal (such as a second signature tone) in the audio portion of the second segment of content may indicate a stop time of the first advertisement. Accordingly, an inaudible first signature tone or first unique set of audible tones may indicate (to a secondary playback system) a start time of pausing playback of secondary content (such as audible description of images playback on the primary playback system on the secondary playback system; the inaudible second signature tone or second unique set of audible tones may indicate a stop time of pausing playback of the secondary content on the secondary playback system.

Thus, when the primary playback system is not playing back a respective advertisement between the first signature of one or more tones and the second signature of one or more tones, the secondary playback system is still synchronized with the primary playback system to playback a description of images displayed on a display screen of the primary playback system. For example, the secondary playback system pauses playback of the description of images while the primary playback system plays back a respective advertisement.

Additionally, in summary, playback of the supplemental audio signals by the primary system controls operation of a secondary playback system playing back secondary content. In other words, as previously discussed, the playback of the supplemental audio signal by the primary playback system is operative to control synchronization of a secondary playback system playing back secondary content such as an audio description of images associated with the primary content played back on the primary playback system.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, examples herein are directed to a method, system, computer program product, etc., that supports operations as discussed herein.

One example as discussed herein includes a computer readable storage medium and/or system having instructions stored thereon to manage playback of content. The instructions, when executed by computer processor hardware, cause the computer processor hardware (such as one or more co-located or disparately processor devices or hardware) to: receive primary content including multiple segments of content encoded for playback on a primary playback system, a first segment of the multiple segments of content including an image portion and an audio portion for playback by the primary playback system; and modify the audio portion of the first segment of content to include a supplemental audio signal, subsequent playback of the supplemental audio signal operative to control synchronization of a secondary playback system with respect to the primary playback system.

Another example as discussed herein includes a computer readable storage medium and/or system having instructions stored thereon to support playback of supplemental media. The instructions, when executed by computer processor hardware, cause the computer processor hardware (such as one or more co-located or disparately processor devices or hardware) to: receive primary content including multiple segments of content for playback, the multiple segments of content including a first segment of content modified by a video analyzer resource to include a supplemental audio signal; and during playback of the first segment of content, play back both an original audio signal associated with the first segment of content and the supplemental audio signal.

Note that the ordering of the steps above has been added for clarity sake. Further note that any of the processing steps as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing synchronization services associated with playback of primary content and secondary content on different playback devices (systems). However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention (s). Instead, this brief description only presents general examples and corresponding points of novelty over conventional techniques. For additional details and/or possible perspectives (permutations) of the invention(s), the reader is directed to the Detailed Description section (which is a further summary as well as detailed description) and corresponding figures of the present disclosure as further discussed below.

Figure 1:
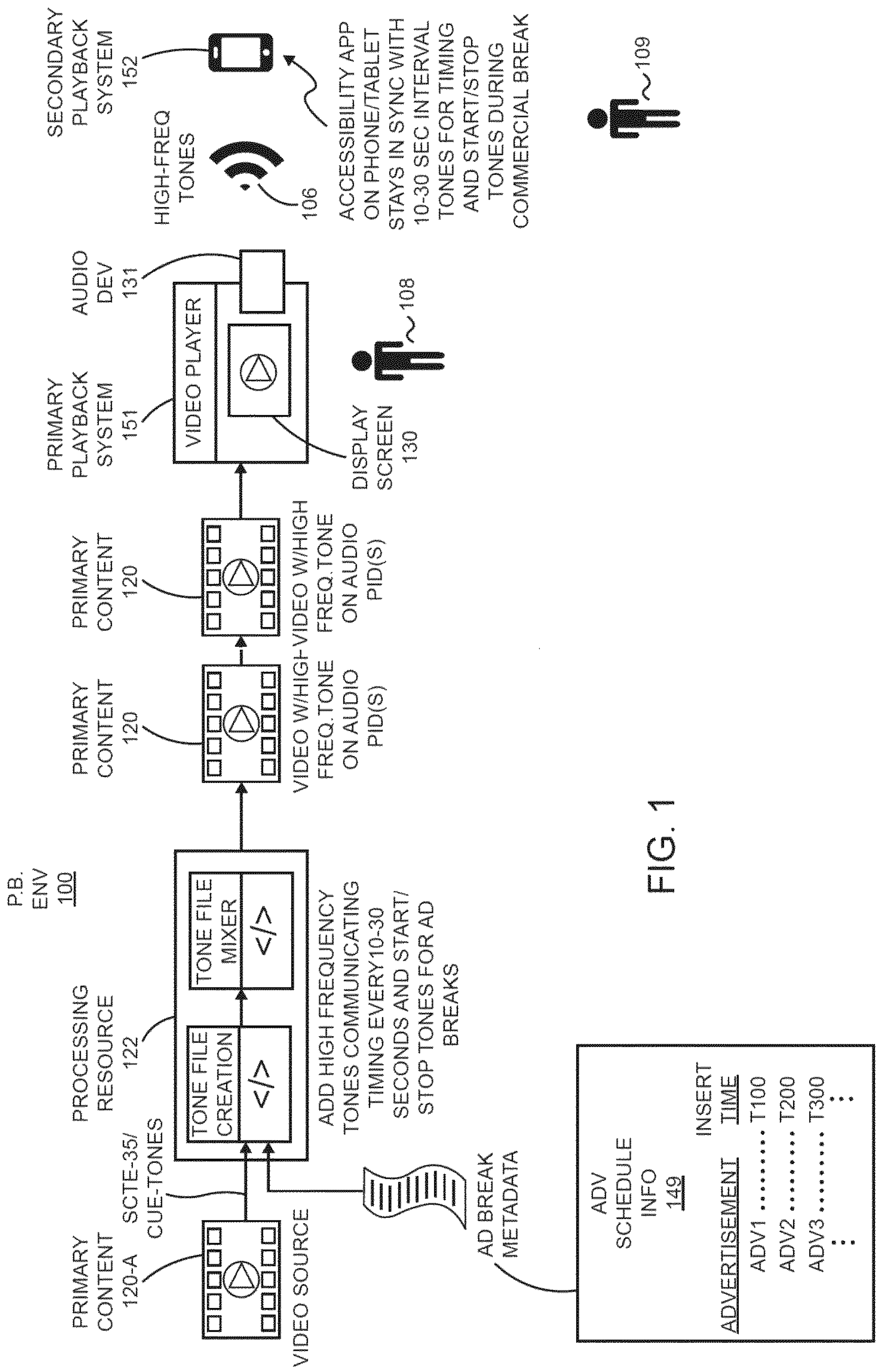
FIG. 1 is an example diagram illustrating modification of segments of primary content to support playback synchronization of secondary content with respect to playback of the primary content as discussed herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

The system as discussed mitigates desynchronization of playing back supplemental media such as audio description, closed captioning, etc., on a secondary playback system caused by advertisement breaks when playing back primary content such as video on a respective primary playback system.

For example, a system as discussed herein includes a primary playback system and a secondary playback system. The primary playback system receives primary content including multiple segments of content for playback. The multiple segments of content may include a first segment of content modified by a video analyzer resource to include a supplemental signal (i.e., a signal not originally in the primary content). During playback of the first segment of content, the primary playback system plays back both an original audio signal associated with the first segment of content and the supplemental signal. The supplemental signal supports synchronization of the secondary playback system with the primary playback system.

Now, more specifically, with reference to the drawings, FIG. 1 is an example diagram illustrating a system operative to modify segments of primary content to support synchronization with playback of primary content and corresponding secondary content as discussed herein.

In this example, the playback environment 100 includes video processing resource 122, primary playback system 151, and secondary playback system 152.

Note that each of the components as discussed herein can be implemented as hardware, executed software, or a combination of hardware and executed software. For example, the processing resource 122 can be implemented as video processing hardware, video processing software, or a combination of video processing hardware and video processing software; the primary playback system 151 can be implemented as primary playback hardware, primary playback software, or a combination of primary playback hardware and primary playback software; the secondary playback system 152 can be implemented as secondary playback hardware, secondary playback software, or a combination of secondary playback hardware and secondary playback software; and so on.

In this example, the processing resource 122 receives the primary content 120-A as well as the advertisement schedule information 149. As its name suggests, the advertisement schedule information 149 indicates different times or locations in the primary content 120-A where advertisements are scheduled for playback by a respective playback system when the corresponding primary content 120-A is played back.

In this example, the advertisement schedule information 149 indicates to insert a respective advertisement ADV1 at timestamp T100 between playback of the segment SEG100 and segment SEG101 of the primary content 120; the advertisement schedule information 149 indicates to insert a respective advertisement ADV2 between playback of the segment SEG200 and segment SEG201 of the primary content 120; the advertisement schedule information 149 indicates to insert a respective advertisement ADV3 between playback of the segment SEG300 and segment SEG301 of the primary content 120; and so on.

Figure 2:
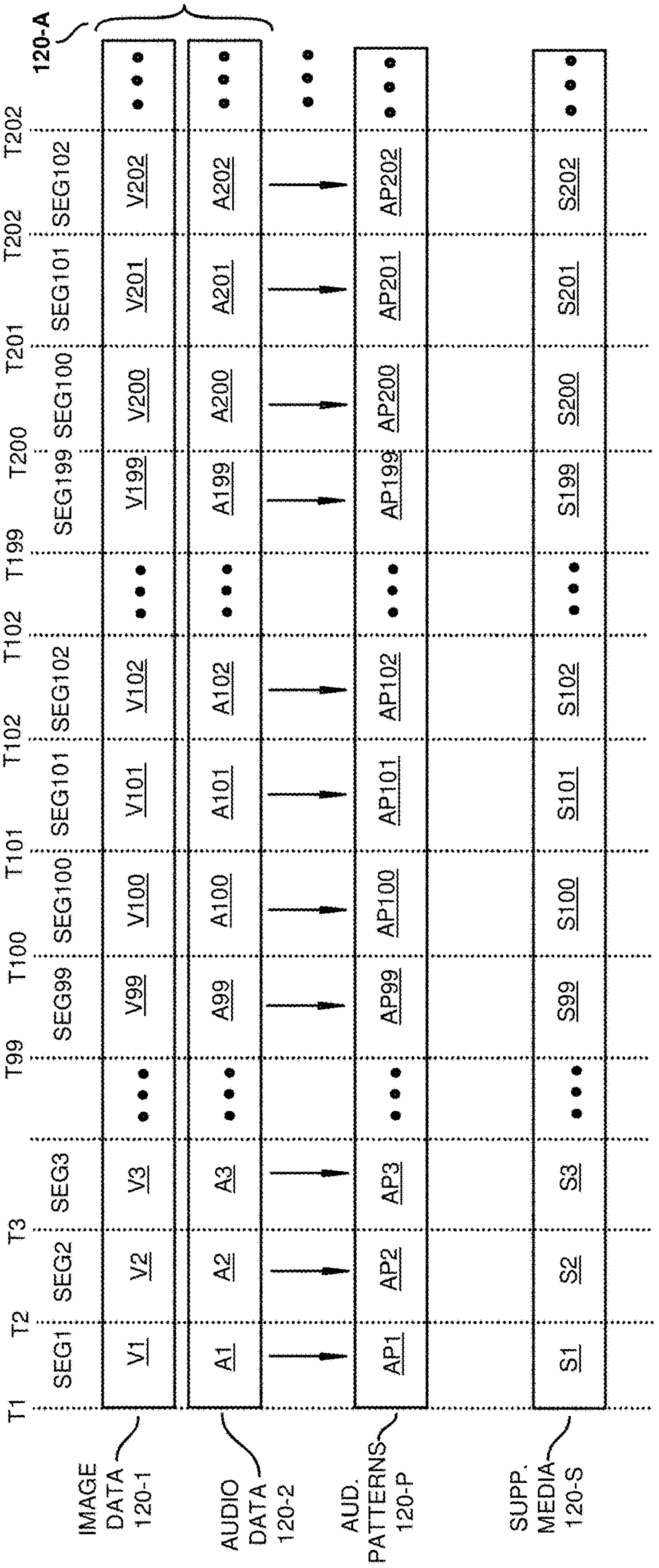
FIG. 2 is an example diagram illustrating mapping of segments of content associated with a title of content to segments of corresponding secondary content such as supplemental media as discussed herein.

An example of the primary content 120-A is shown in FIG. 2.

FIG. 2 is an example diagram illustrating mapping of segments of content associated with a title of content to segments of corresponding supplemental media as discussed herein.

As shown, the primary content 120-A (such as video data) in this example includes image data 120-1 such as played back on display screen 130 of the primary playback system 151 and audio data 120-2 such as played back by the audio device 131 (such as a speaker) of the primary playback system 151. Playback of the image data 120-1 produces moving images on a respective display screen.

In this example, segment SEG1 of the primary content 120-A is assigned time stamp T1 and includes image data V1 and audio data A1; segment SEG2 of primary content 120-A is assigned time stamp T2 and includes image data V2 and audio data A2; segment SEG3 of primary content 120-A is assigned time stamp T3 and includes image data V3 and audio data A3; . . . ; segment SEG99 of primary content 120-A is assigned time stamp T99 and includes image data V99 and audio data A99; segment SEG100 of primary content 120-A is assigned time stamp T100 and includes image data V100 and audio data A100; segment SEG101 of primary content 120-A is assigned time stamp 101 and includes image data V101 and audio data A101; . . . , segment SEG199 of primary content 120-A is assigned time stamp T199 and includes image data V199 and audio data A199; segment SEG200 of primary content 120-A is assigned time stamp T200 and includes image data V200 and audio data A200; segment SEG201 of primary content 120-A is assigned time stamp 201 and includes image data V201 and audio data A201; and so on.

With reference to FIG. 1 and FIG. 2, note that the image data 120-1 and audio data 120-2 for each of the segments are correlated with each other for simultaneous playback such that sound (derived from playback of the audio data 120-2) outputted from the audio device 131 tracks corresponding playback of images (derived from playback of the image data 120-1) on display screen 130.

For example, audio data A1 associated with segment SEG1 includes appropriate audio for playback on audio device 131 (producing corresponding sound) during playback of image data V1 (as images on display screen 130) associated with segment SEG1; audio data A2 associated with segment SEG2 includes appropriate audio for playback on audio device 131 (producing sound) during playback of image data V2 (as images on display screen 130) associated with segment SEG2; audio data A3 associated with segment SEG3 includes appropriate audio for playback on audio device 131 (producing sound) during playback of image data V3 (as images on display screen 130) associated with segment SEG3; . . . , audio data A101 associated with segment SEG101 includes appropriate audio for playback on audio device 131 (producing corresponding sound) during playback of image data V101 (as images on display screen 130) associated with segment SEG101; audio data A102 associated with segment SEG102 includes appropriate audio for playback on audio device 131 (producing sound) during playback of image data V102 (as images on display screen 130) associated with segment SEG102; audio data A103 associated with segment SEG103 includes appropriate audio for playback on audio device 131 (producing sound) during playback of image data V103 (as images on display screen 130) associated with segment SEG103; and so on.

In one example, as previously discussed, playback of the audio data A1 by the audio device 131 (a.k.a., speaker) results in an audio signal (emanating from audio device 131) as indicated by the audio pattern AP1; playback of the audio data A2 results in an audio signal as indicated by the audio pattern AP2; playback of the audio data A3 results in an audio signal as indicated by the audio pattern AP3; . . . ; playback of the audio data A101 by the audio device 131 (a.k.a., speaker) results in an audio signal (emanating from audio device 131) as indicated by the audio pattern AP101; playback of the audio data A102 results in an audio signal as indicated by the audio pattern AP102; playback of the audio data A103 results in an audio signal as indicated by the audio pattern AP103; . . . ; playback of the audio data A201 by the audio device 131 (a.k.a., speaker) results in an audio signal (emanating from audio device 131) as indicated by the audio pattern AP201; playback of the audio data A202 results in an audio signal as indicated by the audio pattern AP202;

playback of the audio data A203 results in an audio signal as indicated by the audio pattern AP203; and so on.

Note further that it is desirable to playback corresponding supplemental media 120-S (a.k.a., secondary content) on a secondary playback system 152 synchronized with respect to playback of the primary content 120-A on the primary playback system 151.

More specifically, it is desirable that the secondary playback system 152 plays back the supplemental media S1 (visual signal or audio signal) at approximately the same time that the display screen 130 of the primary playback system 151 displays image data V1 and the audio device 131 of the primary playback system audibly plays back audio data A1; it is desirable that the secondary playback system 152 plays back the supplemental media S2 (visual signal or audio signal) at approximately the same time that the display screen 130 of the primary playback system 151 displays image data V2 and the audio device 131 of the primary playback system audibly plays back audio data A2; it is desirable that the secondary playback system 152 plays back the supplemental media S3 (visual signal or audio signal) at approximately the same time that the display screen 130 of the primary playback system 151 displays image data V3 and the audio device 131 of the primary playback system audibly plays back audio data A3; and so on.

In one example, the supplemental media 120-S is configured to include an audio description of the image data 120-1. For example, the image data V1 may include an image of a white house against a background countryside. In such an instance, the supplemental media S1 in such an instance would include an audio description describing the white house against the background countryside.

As another example, the image data V101 may include a different scene such as an image of 2 persons standing next to a red car. The supplemental media S101 in such an instance would include an audio description of the 2 persons standing next to the red car and what the 2 persons are doing in the image displayed on display screen 130.

In a similar manner, each of the segments of the supplemental media 120-S provides a description of the images as indicated by the image data 120-1. The user 109 operating the secondary playback system 152 may wear headphones that playback the respective supplemental media 120-S.

It is further noted that the playback of the audio data 120-2 results in output such as audio patterns 120-P as shown in FIG. 2. For example, playback of the audio data A1 by the audio device 131 results in a respective sound output such as audio pattern AP1 outputted by the audio device 131; playback of the audio data A2 by the audio device 131 results in a respective sound output such as audio pattern AP2 outputted by the audio device 131; playback of the audio data A3 by the audio device 131 results in a respective sound output such as audio pattern AP3 outputted by the audio device 131; and so on.

Note further that any of the different segments of content can be marked to include appropriate timestamps (a.k.a., markers). For example, the first segment of the image data 120-1 such as image data V1 can be marked with the timestamp T1 to indicate a relative location of the image data in the image data 120-1 (such as a data stream). Additionally, the first segment of the supplemental media 120-S such as segment of supplemental media S1 can be marked with the timestamp T1 to indicate that the segment of supplemental media S1 corresponds to the image data V1.

The second segment of the image data 120-1 such as image data V2 can be marked with the timestamp T2 to indicate a relative location of the image data in the image data 120-1 (such as a data stream). Additionally, the second segment of the supplemental media 120-S such as segment of supplemental media S2 can be marked with the timestamp T2 to indicate that the segment of supplemental media S2 corresponds to the image data V2.

In this manner, each of the supplemental media segments associated with the supplemental media 120-S can be indexed with respect to the corresponding segments of the image data 120-1 and the audio data 120-2.

Referring again to FIG. 1, the processing resource 122 receives the primary content 120-A including multiple segments of content encoded for playback on a respective playback system. In this example, assume that the advertising schedule information 149 indicates that a respective advertisement ADV1 is scheduled for playback between segment SEG100 and segment SEG101 of the primary content 120-A.

As previously discussed, the segment SEG100 of the multiple segments of content includes an image portion (image data V100) and an audio portion (audio data A100) for playback by the primary playback system. The supplemental data to be played back by a secondary playback device such as secondary playback system 152 during playback of the segment SEG100 includes the supplemental data S100 associated with the supplemental media 120-S.

The processing resource 122 modifies the original primary content 120-*a* using the advertisement schedule information 149 to produce the modified primary content 120. An example of the modified primary content 120 is shown in FIG. 3.

Figure 3:
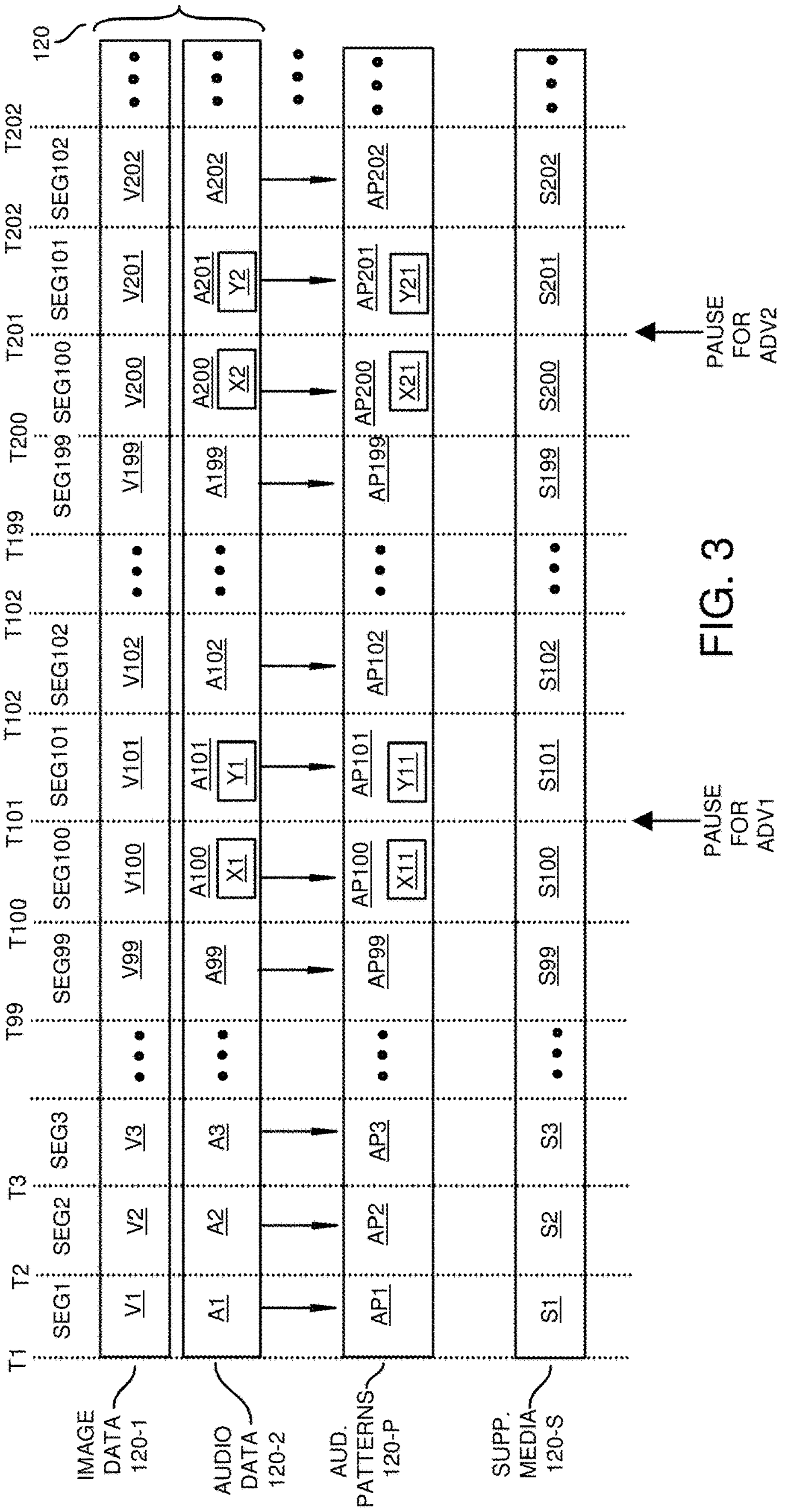
FIG. 3 is an example diagram illustrating modified primary content with respect to secondary content as discussed herein.

As shown in FIG. 3, and in furtherance of synchronizing playback of the primary content 120-A and the supplemental media 120-S, in accordance with the advertisement schedule information 149 indicating a first advertisement ADV1 scheduled for playback between segment SEG100 and segments S101, the processing resource 122 modifies the audio portion (A100) of the first segment of content to further include a supplemental audio signal X1 such that the audio portion of the segment SEG100 includes a combination of the original audio signal A100 as well as the supplemental audio signal X1. If desired, the signal A100 and signal X1 can be combined into a single signal. Subsequent playback of the supplemental audio signal X1 by the primary playback system 151 is operative to control synchronization of the secondary playback system 152 with respect to the primary playback system 151.

Note that the audio signal X1 can be generated to playback any suitable information (such as sound that when playback is inaudible to a respective human ear, wireless signal, etc.) to control operation of the secondary playback system 152.

For example, the signal X1 (marker, tag, etc.) can be encoded with an audible/inaudible tone to indicate a pause condition associated with playback of the supplemental media 120-S on the secondary playback system 152. In such an instance, when the corresponding audible/inaudible sound X11 played back by the audio device 131 of the primary playback system 151 is detected by the secondary playback system 152, the secondary system 152 pauses playback of the supplemental media 120-S to accommodate the playback of the advertisement ADV1 on the primary playback system 151.

In one example, the modified audio portion of the segment of content SEG100 includes encoding the supplemental audio signal X1 to play back the signal X11 at an audible frequency (such as one or more tones) greater than a threshold of human hearing. In such an instance, the original audio signal A100 is encoded via at least one audible frequency that is audibly detectable by a user 108 operating the primary playback system 151. The supplemental audio signal X1 is encoded via at least one frequency that is not audibly detectable by the user 108 operating the primary playback system 151.

Thus, the audio portion of the segment SEG100 of the primary content can be configured to include an original audio signal A100 prior to the modifying. Modifying the audio portion of the first segment of content SEG100 may include the processing resource 122 or other suitable entity producing the modified audio portion of the first segment SEG100 of primary content to include a combination of the original audio signal A100 and the supplemental audio signal X1 for playback by the primary playback system as further shown in FIG. 3.

In a further example, note that playback of the supplemental audio X1 occurring around timestamp T100 may indicate a respective start time of playback of the advertisement ADV1 as specified by the advertising schedule information 149. It is further noted that the playback of the supplemental audio Y1 occurring around timestamp T101 may indicate a respective stop time of playback of the advertisement ADV1 as specified by the advertising schedule information 149. Playback of the supplemental audio signal Y1 causes the secondary playback system 152 to continue playing back the supplemental media 120-S at segment S101.

In a further example, note that playback of the supplemental audio X2 occurring around timestamp T200 may indicate a respective start time of playback of the advertisement ADV2 as specified by the advertising schedule information 149. It is further noted that the playback of the supplemental audio Y2 occurring around timestamp T201 may indicate a respective stop time of playback of the advertisement ADV2 as specified by the advertising schedule information 149. Playback of the supplemental audio signal Y2 causes the secondary playback system 152 to continue playing back the supplemental media 120-S at segment S201.

In this manner, the primary content 120 and the secondary content 120-S may include any number of advertisement breaks.

Figure 4:
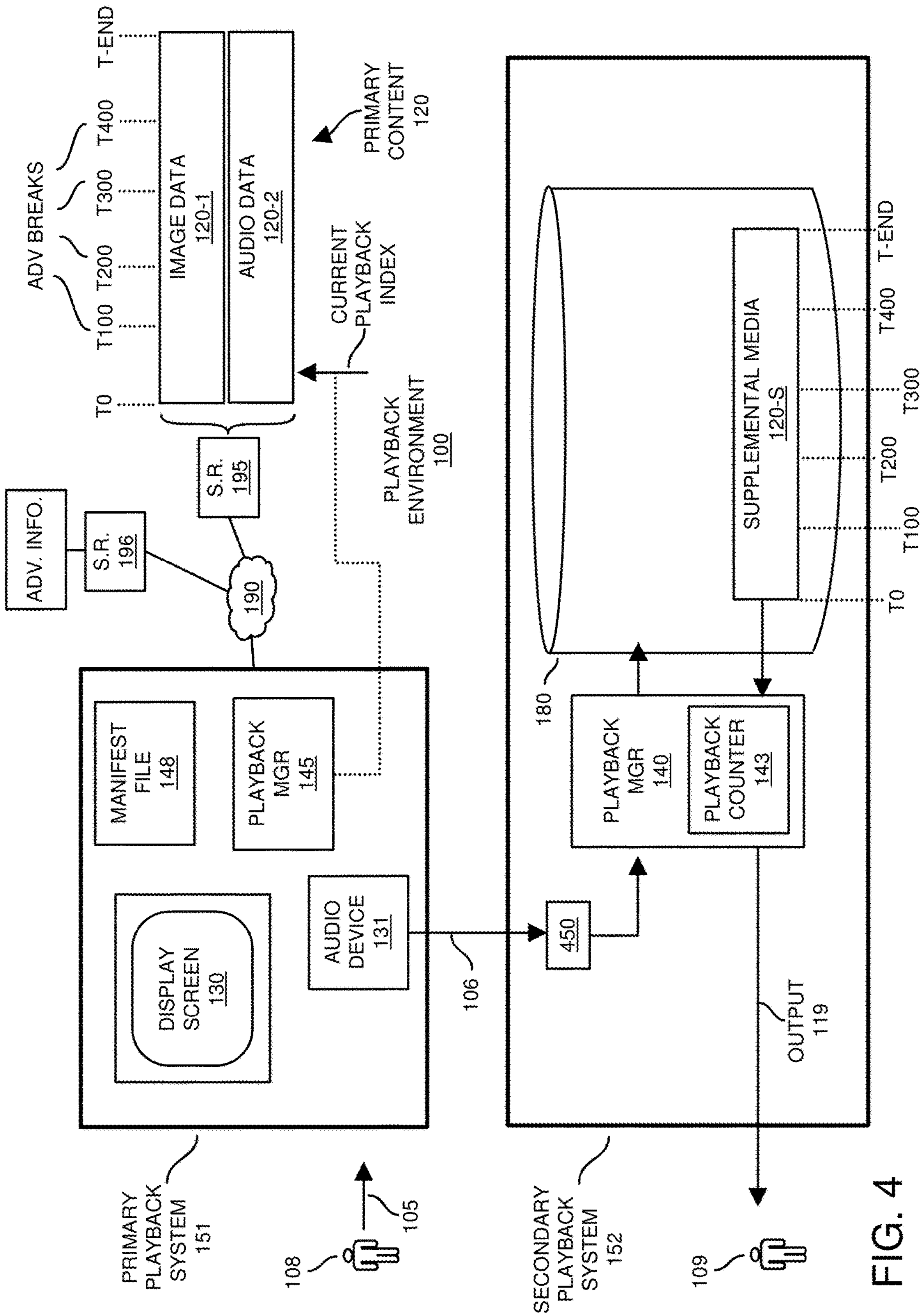
FIG. 4 is an example diagram illustrating multiple playback systems and synchronization of same via control signals such as inaudible tones as discussed herein.

FIG. 4 is an example diagram illustrating multiple playback systems and synchronization of same via the audible tones as discussed herein.

As shown, playback environment 100 includes primary playback resource 151 (first playback system), secondary playback resource 152 (second playback system), network 190, server resource 195, server resource 196, etc.

Primary playback resource 151 includes display screen 130, audio device 131 (sound generating device) these, and playback manager 145. Secondary playback resource 152 includes playback manager 140 and repository 180. If desired, the playback manager 140 can be configured to implement a playback counter 143 to facilitate playback of the supplemental media 120-S with respect to the playback of the primary content 120.

Note that each of the resources as discussed herein can be configured to operate as hardware, executed software, or a combination of hardware and software.

More specifically, the playback manager 140 as discussed herein can be implemented as playback manager hardware, playback manager software, or a combination of playback manager hardware and playback manager software; the playback manager 145 as discussed herein can be implemented as playback manager hardware, playback manager software, or a combination of playback manager hardware and playback manager software; the primary playback system 151 (a.k.a., primary playback resource) as discussed herein can be implemented as primary playback hardware, primary playback software, or a combination of primary playback hardware and primary playback software; the secondary playback system 152 (a.k.a., primary payback resource) as discussed herein can be implemented as secondary playback hardware, secondary playback software, or a combination of secondary playback hardware and secondary playback software; and so on.

In one example, the secondary playback system 152 is disparately located with respect to the primary playback system 151. For example, in one example, the secondary playback system 152 may be a mobile communication device or other suitable entity operated by respective user 109. The secondary playback system 152 may include headphones worn by the respective user 109.

In further example examples, via control input 105, the user 108 selects respective primary content 120 for playback on the display screen 130. This can include selection of a symbol displayed on display screen 130, pressing one or more buttons on a remote control device, etc. Thus, in one example, the user 108 operates a respective remote control device that generates input 105 to select playback of the primary content 120.

Primary content 120 can be any suitable information. For example, primary content 120 can be video on demand data, movie, title of content, image data, etc., retrieved for playback on the primary playback resource 151.

In response to receiving a command (such as via input 105) to playback primary content 120 (such as a specific title of content), the playback manager 145 retrieves manifest file 148 associated with the primary content 120 from server resource 195 or other suitable entity.

In one example, the primary playback resource 151 and corresponding playback manager 145 uses the manifest file 148 as a basis in which to retrieve and playback segments of content associated with the selected primary content 120.

For example, the manifest file 148 indicates different segments of content associated with primary content 120 for retrieval from the server resource 195. In one example, the manifest file 148 includes pointers (such as URLs or other suitable information) indicating locations in network 190 from which to retrieve the respective segments of content for playback.

In certain instances, the manifest file 148 may offer multiple different bit rates from which the playback manager 145 is able to retrieve segments of content for playback on the playback system (display screen 130 and audio device 131).

In still further example examples, as previously discussed, the primary content 120 is broken down into discrete, retrievable segments of primary content 120 that are played back by the display screen 130 and the audio device 131.

Referring again to FIG. 4, examples herein further include, via implementation of playback manager 140, playing back supplemental media 120-S associated with primary content 120 for user 109. As previously discussed, the playback of the supplemental media 120-S depends on a current playback location of the primary playback resource 151 playing back primary content 120 on display screen 130 and audio device 131 for user 108.

For example, as previously discussed, the user 108 selects a specific title of content (such as primary content 120) for playback by the primary playback resource 151. In one example, the secondary playback resource 152 receives notification of the selection of the primary content 120 being played back on the primary playback resource 151.

Alternatively, an entity such as user 108 or user 109 programs the secondary playback system 152 to playback supplemental media 120-S associated with the selected primary content 120. For example, the user 108 or user 109 notifies the secondary playback system 152 that primary content 120 has been selected for playback on the primary playback resource 151 or the user 108/user 109 selects the supplemental media 120-S associated with the primary content 120 for playback on the secondary playback resource 152.

In one example, the user 108 or user 109 downloads the companion information (supplemental media 120-S such as a media file) associated with the selected primary content 120 from a server or other suitable entity over network 190 to the represent 180.

The primary playback system 151 plays back the selected primary content 120 on display screen 130 and audio device 131. In one example, the audio device 131 plays back the corresponding audio data 120-2 to produce the signal 106. The secondary playback system 152 includes the sensor 450 to monitor the signal 106 such as audio output of the primary playback system 151.

Via signal 106 (audio or otherwise) received from the primary playback system 151, the secondary playback system 152 monitors progress of the primary playback system 151 playing back the selected primary content 120. As previously discussed, the signal 106 can be configured to a current playback location of the primary playback system 151 playing back the primary content 120. Additionally, the signal 106 can be configured to include supplemental control tones produced by the processor 122 as previously discussed.

Based on detected progress indicative of a current playback location of the playback manager 145 playing back the primary content 120, the playback manager 140 (such as in or associated with the secondary playback system) synchronizes playback of supplemental media (such as descriptive audio, closed caption text, etc.) associated with the primary content 120 on the secondary playback system operated by a user.

Note that the output 119 can be any suitable perceptible signal such as text, images, audio, etc., played back on the secondary playback resource 152.

In one example, as previously discussed, the primary playback system 151 uses the manifest file 148 to retrieve different segments of content for display on a display screen 130 and playback of audio on audio device 131 of the primary playback resource 151. An example of the manifest file 148 is shown in FIG. 5.

Figure 5:
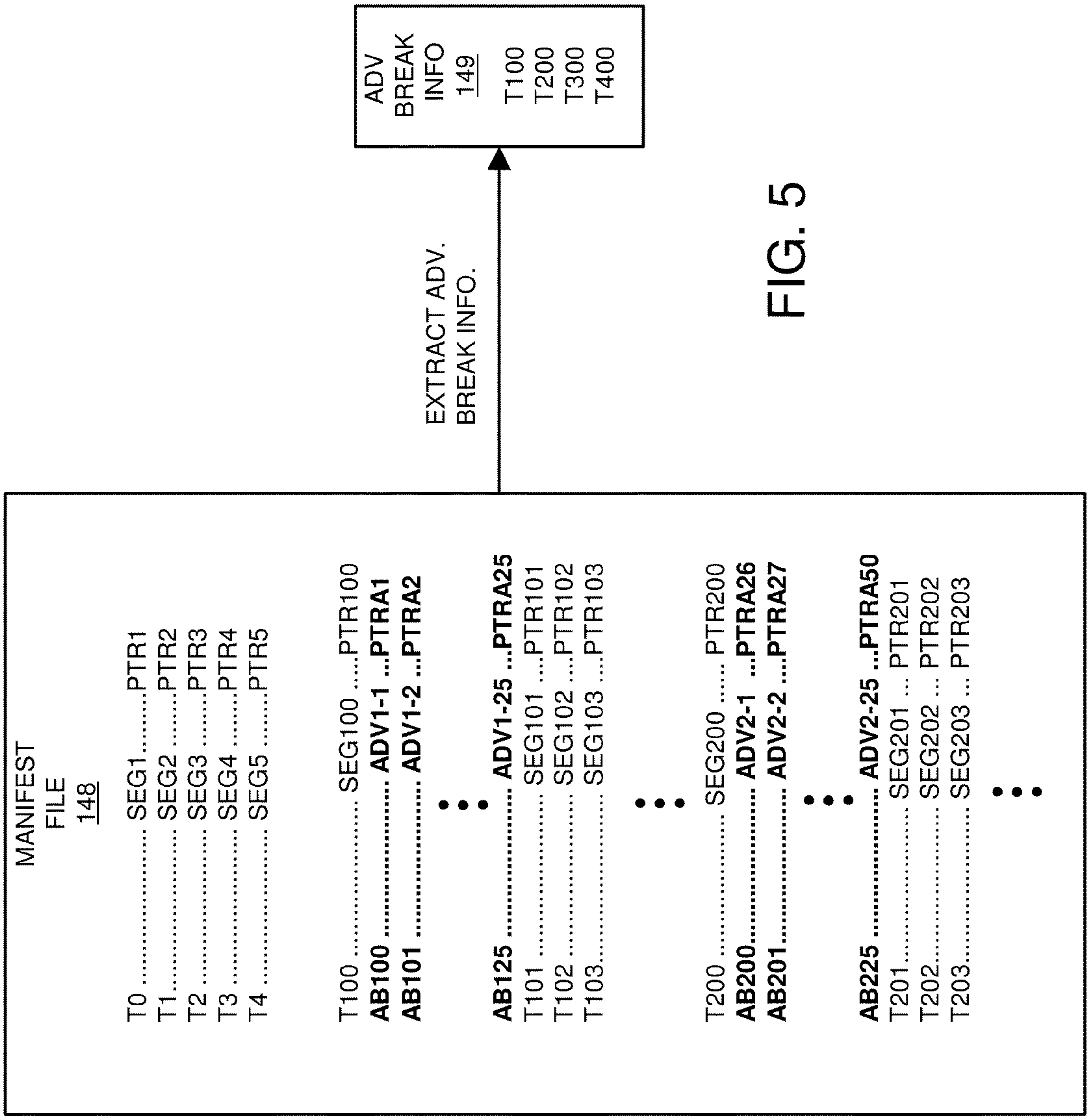
FIG. 5 is an example diagram illustrating a manifest file indicating advertisement breaks as discussed herein.

The manifest file 148 in FIG. 5 includes pointers used by the playback manager 145 to retrieve the segments of primary content 120 from the server resource 195 or playback on the display screen 130 and audio device 131. For example, the manifest file 148 further includes pointers used by the playback manager 145 to retrieve the segments of content associated with the respective advertisements during appropriate times such as: between playing back segments SEG100 assigned timestamp T100 and SEG101 assigned timestamp T101; between playing back segments SEG200 assigned timestamp T200 and SEG201 assigned timestamp T201; and so on.

Accordingly, the primary playback system 151 receives input 105 from the user 108 to playback the primary content 120. As previously discussed, the primary content 120 includes configuration of advertisement breaks at timestamp T100, the timestamp T200, timestamp T300, etc.

In response to the input 105 (specifying a title of content and playback of content 120), the primary playback system 151 can be configured to receive the primary content 120 and corresponding segments of content from server resource 195 or other suitable entity.

In this example, the primary content 120 includes multiple segments of content for playback, where the multiple segments of content include a segment of content SEG100 modified by a video analyzer resource (a.k.a., processing resource 122) to include a supplemental audio signal X1 as previously discussed in FIG. 3. During playback of the segment of content SEG100, the primary playback system 151 plays back both an original audio signal A100 associated with the segment of content SEG100 and the supplemental audio signal X1. Playback of the playback of the segment of content SEG101 on the primary playback system 151 thus includes the audio device 131 (a.k.a., sound generating system) audibly playing back an audio portion (portion of audio data 120-2) of the segment of content SEG101 such as encoded with the original audio signal A100 and the supplemental audio signal X1. The playback manager 145 also visually plays back an image portion (V100) of the segment of content SEG100 on the display screen 130, wherein the image portion (V100) as previously discussed is encoded to include images associated with the segment of content SEG100.

Thus, the supplemental audio signal (X1) associated with the segment of content X1 indicates timing (such as start time) of the primary playback system 151 playing back a first advertisement ADV1 played back on the primary playback system 151, where the first advertisement ADV1 is scheduled for playback on the primary playback system 151 between playback of the segment of content SEG100 and the segment of content SEG101. The supplemental audio signal X1 in the audio portion (audio data 120-2) of the segment of content SEG100 may be encoded to notify a secondary playback system 152 of a start time of the first advertisement ADV1 being played back by the primary playback system 151. As previously discussed, the audio portion or other portion of the second segment of content SEG101 (played after the corresponding advertising) is modified to include a supplemental audio signal Y1, where playback of the corresponding second supplemental audio signal Y11 by the primary playback system 151 is also operative to control synchronization of the secondary playback system 152 with respect to the primary playback system 151. For example, note again that playback of the second supplemental audio signal Y1 in the audio portion of the second segment of content SEG101 results in playback of the audio signal Y11, which indicates a stop time of the first advertisement ADV1 and controls resumption of the secondary playback system 152 playing back the supplemental media 120-S starting at S101 again. Thus, the supplemental control signals X1, Y1, etc., outputted from the audio device 131 as signal 106 controls start and stop times of the secondary playback system 152 playing back the corresponding supplemental media 120-S.

Additionally, with further reference to FIG. 3, the supplemental audio signal (X2) associated with the segment of content X2 indicates timing (such as start time) of the primary playback system 151 playing back advertisement ADV2 played back on the primary playback system 151, where the advertisement ADV2 is scheduled for playback on the primary playback system 151 between playback of the segment of content SEG200 and the segment of content SEG201. The supplemental audio signal X2 in the audio portion (audio data 120-2) of the segment of content SEG200 may be encoded to notify a secondary playback system 152 of a start time of the advertisement ADV2 being played back by the primary playback system 151. As previously discussed, the audio portion or other portion of the second segment of content SEG201 (played after the corresponding advertising) is modified to include a supplemental audio signal Y21, where playback of the corresponding second supplemental audio signal Y21 by the primary playback system 151 is also operative to control synchronization of the secondary playback system 152 with respect to the primary playback system 151. For example, note again that playback of the second supplemental audio signal Y2 in the audio portion of the second segment of content SEG201 results in playback of the audio signal Y21, which indicates a stop time of the first advertisement ADV2 and controls resumption of the secondary playback system 152 playing back the supplemental media 120-S starting at S201 again. Thus, the supplemental control signals X2, Y2, etc., outputted from the audio device 131 as signal 106 controls start and stop times of the secondary playback system 152 playing back the corresponding supplemental media 120-S.

FIG. 5 is an example diagram illustrating a manifest file including advertisement breaks as discussed herein.

In this example, the manifest file 148 specifies one or more windows of time in which to playback advertisements instead of the segments of content associated with the selected title of primary content 120. As further discussed herein, playback of advertisements on the primary playback system results 151 in the need for the secondary playback system 152 to occasionally re-synchronize or restart playback of the supplemental media 120-S with respect to the primary playback system 151.

More specifically, as previously discussed, the primary playback resource 151 and corresponding playback manager 145 can be configured to use the manifest file 148 to retrieve the different segments of the primary content 120 for playback on the primary playback resource 151. For example, the pointer PTR1 points to a location from which to retrieve segment SEG1; the pointer PTR2 points to a location from which to retrieve segment SEG2; the pointer PTR3 points to a location from which to retrieve segment SEG3; and so on.

Note that manifest file 148 also indicates segments of content associated with retrieval of different advertisement during different windows of time. For example, manifest file 148 indicates pointers and corresponding segments of content (ADV1-1, ADV1-2, . . . , ADV1-25) associated with playback of a first advertisement ADV1 on the primary playback resource 151 in a first window of time between playback of segment SEG100 and segment SEG101 of the primary content 120; manifest file 148 indicates pointers and corresponding segments of content (ADV2-1, ADV2-2, . . . , ADV2-25) associated with playback of a second advertisement ADV2 on the primary playback resource 151 in a second window of time between playback of segment SEG200 and segment SEG201; and so on.

If desired, the playback manager 140 can be configured to use a respective manifest file as a basis in which to retrieve the different segments of supplemental media 120-S.

Figure 6:
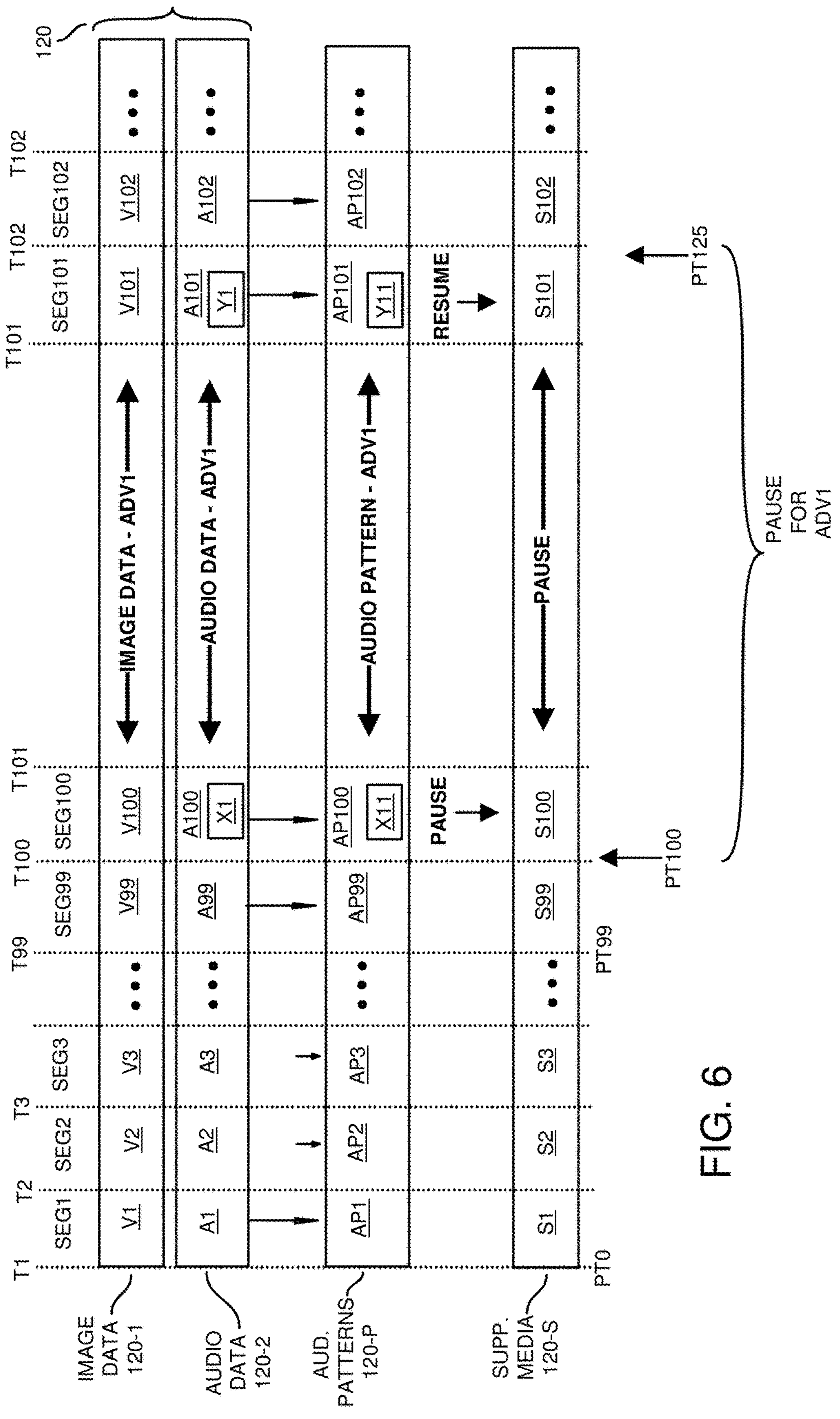
FIG. 6 is an example diagram illustrating playback of an advertisement associated with primary content on a primary playback system while playback of supplemental media is temporarily paused on a secondary playback system as discussed herein.

FIG. 6 is an example diagram illustrating controlling playback of supplemental media based on detected control signals as discussed herein.

As previously discussed, the playback of the audio signal X1 in the audio data 120-2 produces the signal X11 outputted from the audio device 131 or other suitable entity. The secondary playback system 152 includes the sensor 450 to monitor presence of the signal X11 outputted from the primary playback system 151. In response to detecting the audio signal X1 in or around playback time PT100 indicating that the primary playback system 151 has started or will start play black of a respective advertisement such as ADV1, the playback manager 140 of the secondary playback system 152 discontinues or pauses playback of the supplemental media 120-S at or around PT100.

Additionally, after playing back the image data associated with the advertisement ADV1 and the audio data associated with the advertisement ADV1, the primary playback system 151 resumes playback of the image data V101 and a combination of the audio data A101 and signal Y1 (such as one or more sound tones) at or around playback time PT125. Playback of the audio signal Y1 at or around playback time PT125 results in the audio device 131 or other suitable entity outputting the signal Y11. As previously discussed, the secondary playback system 152 includes the sensor 450 to monitor presence of the signal Y11 (such as one or more sound tones or other wireless signal) outputted from the primary playback system 151. In response to detecting the audio signal Y1 (and corresponding signal Y11) indicating that the primary playback system 151 has discontinued playback of the advertisement ADV1 and started play back of the primary content again such as image data V101 and corresponding audio data A 101, the playback manager 145 and corresponding secondary playback system 152 resumes playback of the supplemental media 120-S at or around PT125.

Accordingly, the signals X11 and Y11 outputted from the primary playback system 151 provide a way to control playback of the supplemental media 120-S on the secondary playback system 152.

As previously discussed, the supplemental media 120-S may include an audio description of images encoded for playback in the primary content 120. The synchronization of the secondary playback system with respect to the primary playback system includes: synchronization of playback of the audio description of images on the secondary playback system 152 with respect to playback of the primary content 120 on the primary playback system 151.

Note further that the supplemental signals such as signals X1, Y1, X2, Y2, etc. added to the primary content 120 may include any suitable information or control commands. The supplemental signals may be audio signals encoded with one or more audio tones to indicate different types of control commands. In such an instance, the sensor 450 can be configured to detect each of the signals and decode each respective received signal X11, Y11, etc., into a corresponding command supplied to be playback manager 140. The playback manager 140 controls playback of the supplemental media 120-S based upon those received commands.

Note further that the signal 106 outputted by the primary playback system 151 need not be an audio signal. In certain instances, the signal 106 may be a wireless signal communicated to the secondary playback system 152. Such a wireless signal can be configured with an appropriate control command as produced by the processing resource 122 to indicate information such as stop time, start time, timestamp information of current playback location associated with the primary playback system 151, etc. Additionally, the signal 106 can be configured to include any suitable information (such as encoded via one or more tones or wireless frequencies) such as timestamp information indicating the current playback location of the primary playback system 151 playing back corresponding content 120. If desired, the primary playback system 151 can be configured to continuously wirelessly transmit a respective signal 106 indicating the current timestamp of the primary content 120 currently being played back by the primary playback system 151. In such an instance, the secondary playback system 152 can be configured to use the timestamp information as a basis in which to select which of the multiple segments of the supplemental media 120-S to playback on the secondary playback system 152.

Figure 7:
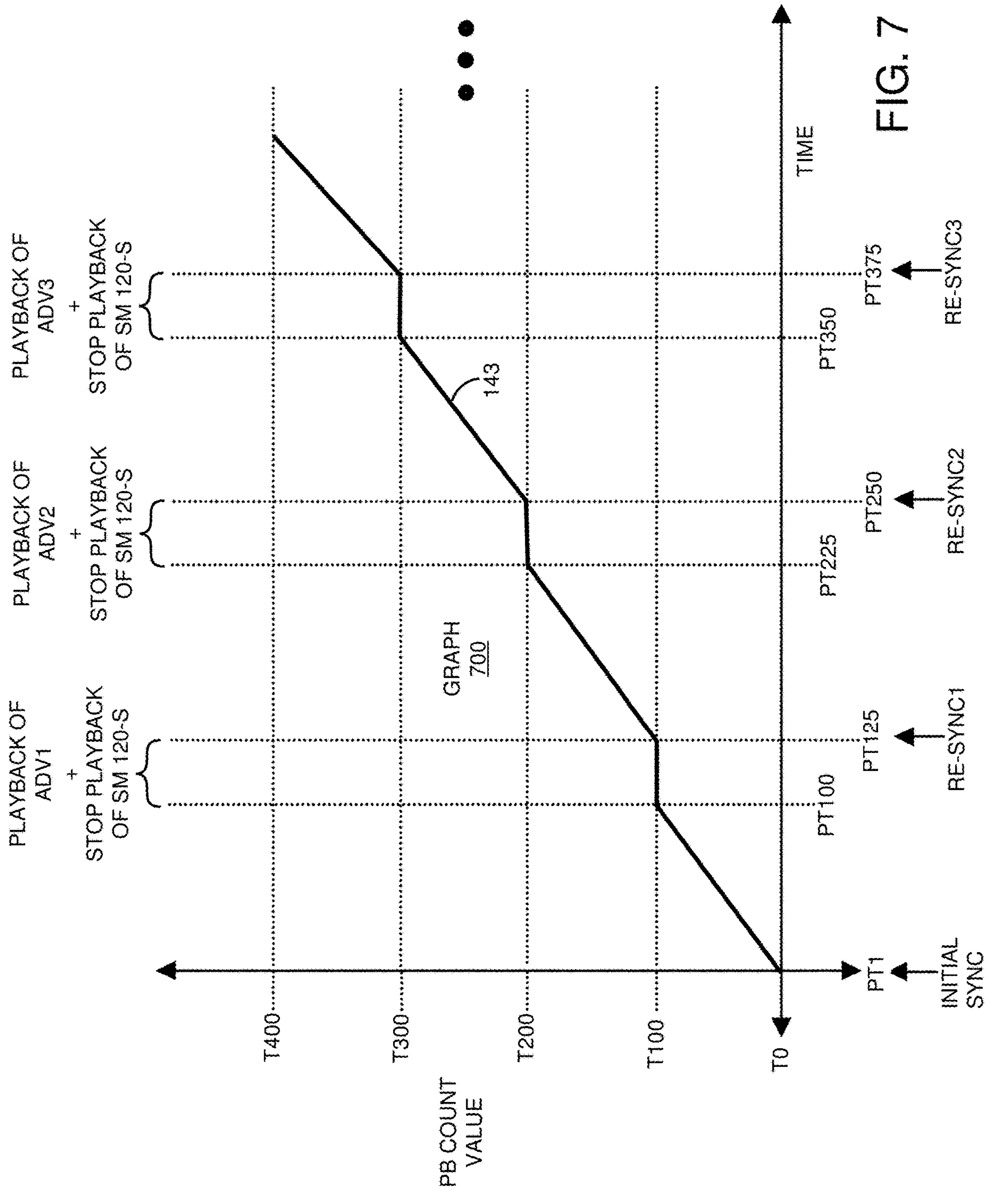
FIG. 7 is an example timing diagram illustrating timing associated with playback of content as discussed herein.

FIG. 7 is an example timing diagram illustrating synchronization of the primary playback system and the secondary playback system according to examples herein.

In this example, the timing diagram (graph 700) illustrates synchronized operation of playing back primary content 120 on the primary playback system 151 and playing back corresponding supplemental media 120-S on the secondary playback system 152 over time.

For example, at or around playback time PT1, the primary playback system 151 and the secondary playback system 152 both start playing back corresponding content. As previously discussed in FIG. 6 and other FIGS., this results in the primary playback system 151 playing back image data V1 and audio data A1 at or around time PT1 while the secondary playback system 152 plays back the supplemental media S1; thereafter, the primary playback system 151 plays back image data V2 and audio data A2 at or around time PT2 while the secondary playback system 152 plays back the supplemental media S2; thereafter, the primary playback system 151 plays back image data V3 and audio data A3 at or around time PT3 while the secondary playback system 152 plays back the supplemental media S3; and so on.

Eventually, at or around playback time PT100, the primary playback system 151 plays back the audio signal X1 in a manner as previously discussed, causing the secondary playback system 152 to discontinue playing back the supplemental media 120-S between playback time PT100 and playback time PT124 (during which the playback count value indicating current playback location of the primary content and the secondary content does not increment). Accordingly, between playback time PT100 and PT125, the primary playback system 151 plays back the advertisement ADV1. At or around playback time PT125, the primary playback system 151 plays back the corresponding audio signal Y1, resulting in generation of the audio pattern Y11 detected by the sensor 450. In response to detecting the audio pattern Y11, which indicates to resume playback of the supplemental media 120-S, the secondary playback system 152 resumes playing back supplemental media at supplemental media S101 (segment). The subsequent to playback time PT125, the playback count value increments.

Both the primary playback system 151 and the secondary playback system 152 continue to synchronously playback respective content until playback time PT225 when the primary playback system plays back the signal X2 and outputs corresponding audio pattern X21 (pause signal) from the audio device 131. In response to detecting the pause signal as indicated by the audio pattern X21 or other encoded wireless command information, the secondary playback system 152 pauses playback of the corresponding supplemental media 120-S while the primary playback system plays back the corresponding advertisement ADV2 between playback time PT225 and playback time PT250. Accordingly, between playback time PT225 and PT250, the primary playback system 151 plays back the advertisement ADV2 in the playback count value does not increment. At or around playback time PT250, the primary playback system 151 plays back the corresponding audio signal Y2, resulting in generation of the audio pattern Y21 detected by the sensor 450. In response to detecting the audio pattern Y21, which indicates to resume playback of the supplemental media 120-S, the secondary playback system 152 resumes playing back of the supplemental media at supplemental media segment S201 (segment) while the primary playback system plays back the corresponding image data V201 and audio data A201.

Figure 8:
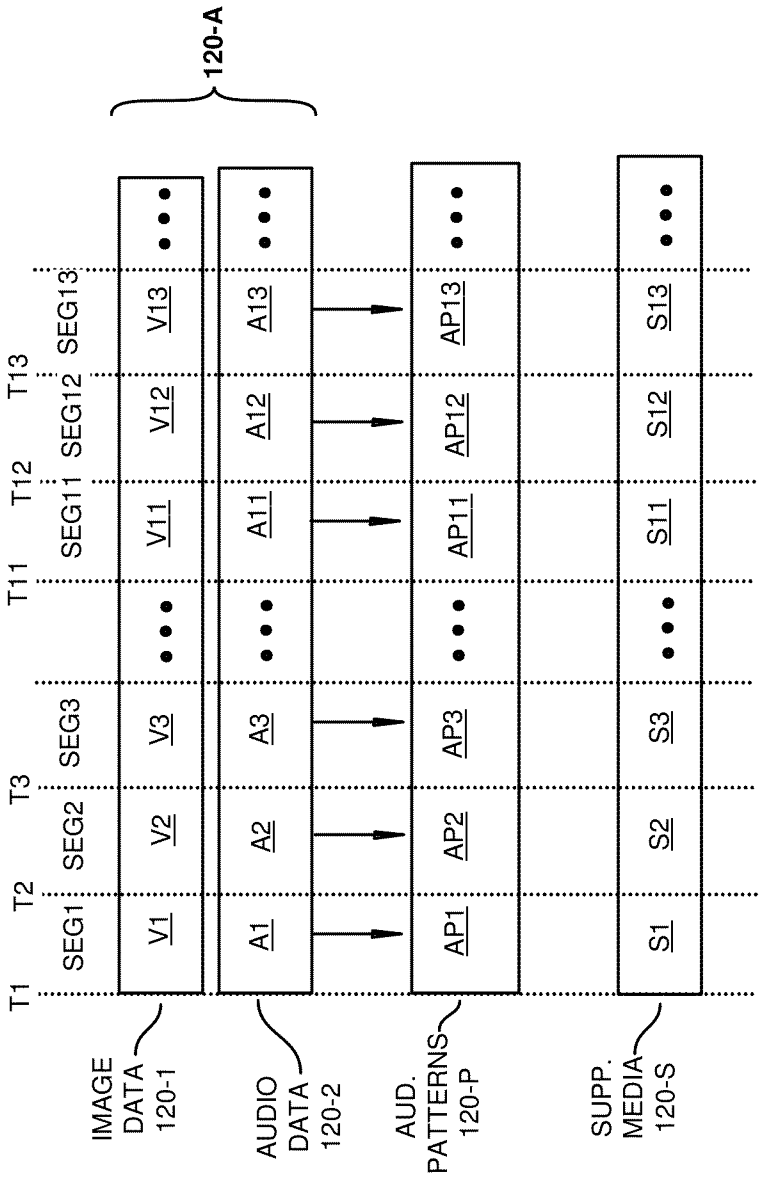
FIG. 8 is an example diagram illustrating mapping of segments of content associated with a title of content to segments of corresponding secondary content such as supplemental media as discussed herein.

FIG. 8 is an example diagram illustrating mapping of segments of content associated with a title of content to segments of corresponding secondary content such as supplemental media as discussed herein.

As shown in FIG. 8, the primary content 120-A (such as video data) in this example includes image data 120-1 such as played back on display screen 130 of the primary playback system 151 and audio data 120-2 such as played back by the audio device 131 (such as a speaker) of the primary playback system 151. Playback of the image data 120-1 produces moving images on a respective display screen.

In this example, segment SEG1 of the primary content 120-A is assigned time stamp T1 and includes image data V1 and audio data A1; segment SEG2 of primary content 120-A is assigned time stamp T2 and includes image data V2 and audio data A2; segment SEG3 of primary content 120-A is assigned time stamp T3 and includes image data V3 and audio data A3; . . . ; segment SEG11 of the primary content 120-A is assigned time stamp T11 and includes image data V11 and audio data A11; segment SEG12 of primary content 120-A is assigned time stamp T12 and includes image data V12 and audio data A12; segment SEG13 of primary content 120-A is assigned time stamp T13 and includes image data V13 and audio data A13; and so on.

Figure 9:
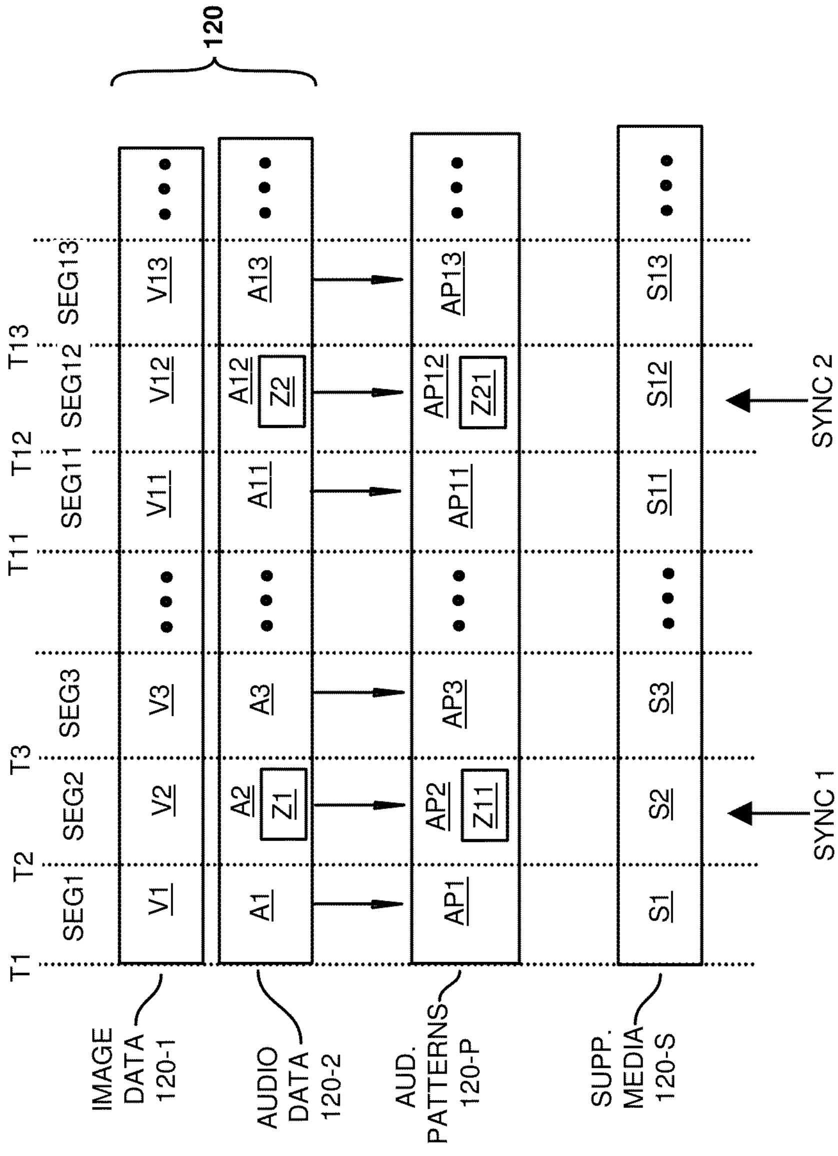
FIG. 9 is an example diagram illustrating modified primary content with respect to secondary content as discussed herein.

As further discussed, and as shown in FIG. 9, the processing resource 122 modifies the primary content 120-A to produce the modified primary 120, which supports synchronization of playback of a primary playback system and the secondary playback system.

FIG. 9 is an example diagram illustrating modified primary content with respect to secondary content as discussed herein.

As previously discussed with respect to FIG. 1, the processing resource 122 can be configured to modify the primary content 120-A to include synchronization information to support synchronized playback of the supplemental media 120-S with respect to playback of the corresponding content 120.

As shown in FIG. 9, the processing resource 122 modifies the audio data 120-2 to include a supplemental audio signal Z1 such that the audio portion of the segment SEG2 includes a combination of the original audio signal A2 as well as the supplemental audio signal Z1. If desired, the signal A2 and signal Z1 can be combined into a single audio signal. Subsequent playback of the supplemental audio signal Z1 by the primary playback system 151 as audio pattern Z11 (such as one or more audio tones) indicating a respective timestamp value T2 is operative to control synchronization of the secondary playback system 152 with respect to the primary playback system 151.

More specifically, the secondary playback system 152 can be configured to detect playback of the supplemental audio signal Z11. The secondary playback system 152 decodes the playback of the audio pattern Z11 into the time stamp value T2. The secondary playback system 152 uses the timestamp value T2 as a basis in which to determine what segment of the supplemental media 120-S to currently play back on the secondary playback system. In this example, the secondary playback system determines that the second segment S2 associated with the supplemental media 120-S should be played back on the playback system 152 in order to maintain synchronicity with respect to playback of the primary content 120 on the primary playback system 151.

The secondary playback system 152 can be configured to implement a respective counter to continue playback of the corresponding supplemental media 120-S over time. In general, as long as the primary playback system 151 continues to play back the primary content at a preset rate, the secondary playback system 152 is synchronized with the primary playback system 151. However, to ensure that playback of the supplemental media 120-S playback on the secondary playback system 152 is synchronized with playback of the primary content 120 on the primary playback system 151 over time, the secondary playback system 152 and corresponding sensor device 150 monitor the output 106 of the primary playback system 151 or additional synchronization signals.

For example, the processing resource 122 modifies the audio data 120-2 to include a supplemental audio signal Z2 such that the audio portion of the segment SEG12 includes a combination of the original audio signal A12 as well as the supplemental audio signal Z2. If desired, the signal A2 and signal Z2 can be combined into a single audio signal. Subsequent playback of the supplemental audio signal Z2 by the primary playback system 151 as audio pattern Z21 (such as one or more audio tones) indicating a respective timestamp value T12 is operative to control synchronization of the secondary playback system 152 with respect to the primary playback system 151. More specifically, the secondary playback system 152 can be configured to detect playback of the supplemental audio signal Z21. The secondary playback system 152 decodes the playback audio pattern Z21 into the time stamp value T12. The secondary playback system 152 uses the timestamp value T12 as a basis in which to determine what segments of the supplemental media 120-S to playback on the secondary playback system. In this example, the secondary playback system determines that the second segment S12 associated with the supplemental media 120-S should be played back on the playback system 152 in order to maintain synchronicity with respect to playback of the primary content 120 on the primary playback system 151.

Note that the audio signal Z1, Z2, etc., can be generated to playback any suitable information (such as sound that when played back is inaudible to a respective human ear, wireless signal such as based on Wi-Fi or other communication protocol, etc.) to control operation of the secondary playback system 152. Thus, the output 106 from the primary playback system 151 may be a wireless signals sensed by the sensor device 450. In such an instance, the secondary playback system 152 decodes the received wireless signal including the encoded timestamp value to determine what portion of the supplemental media 120-S to playback on the secondary playback system 152.

Figure 10:
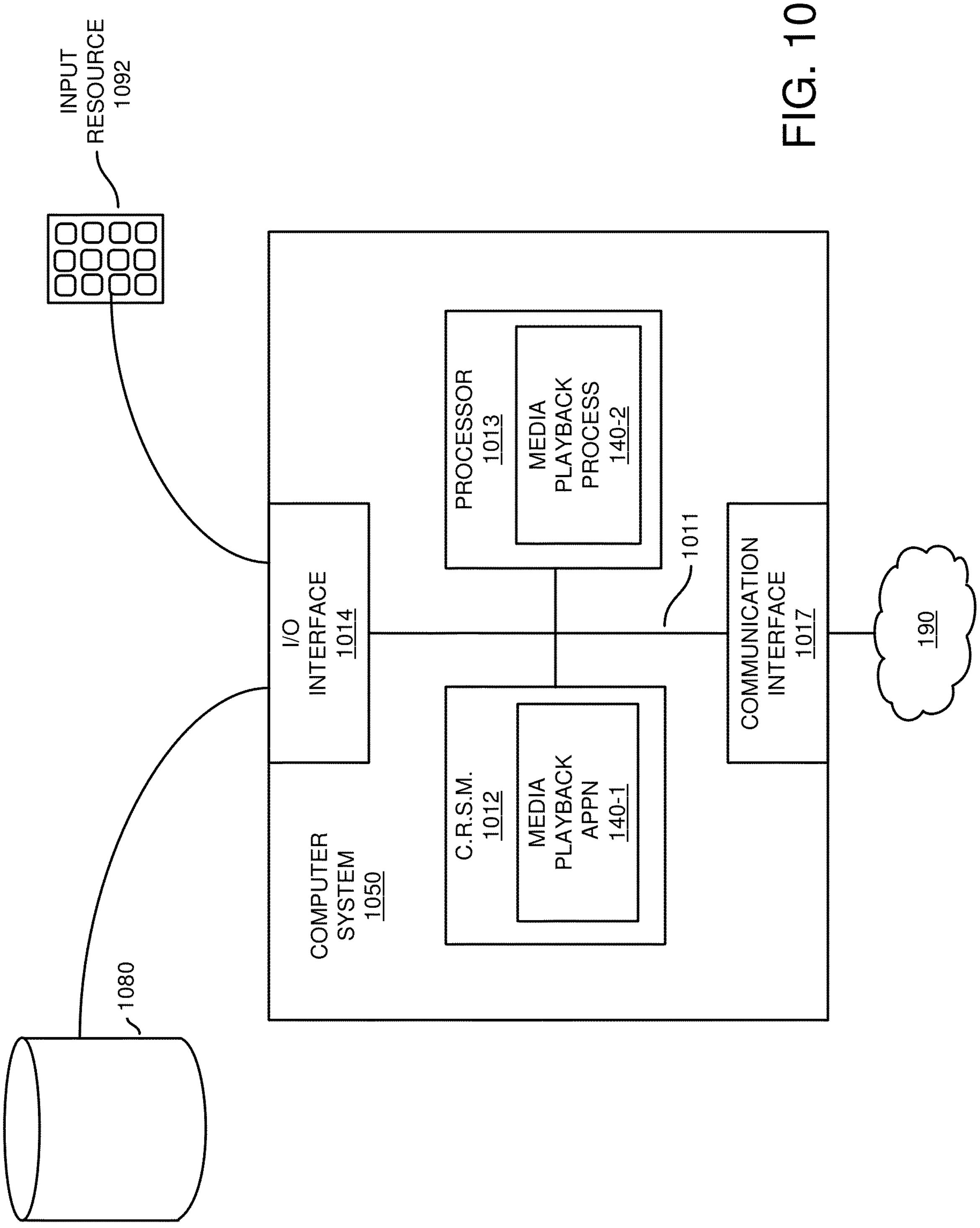
FIG. 10 is an example diagram illustrating example computer architecture operable to execute one or more operations as discussed herein.

FIG. 10 is an example block diagram of a computer system for implementing any of the operations as previously discussed according to examples herein.

Any of the resources (such as primary playback system 151, secondary playback system 152, playback manager 145, playback manager 140, processing resource 122, etc.) as discussed herein can be configured to include computer processor hardware and/or corresponding executable instructions to carry out the different operations as discussed herein.

As shown, computer system 1050 of the present example includes an interconnect 1011 that couples computer readable storage media 1012 such as a non-transitory type of media or any suitable type of hardware storage medium in which digital information can be stored and retrieved, a processor 1013 (computer processor hardware), I/O interface 1014, and a communications interface 1017.

I/O interface(s) 1014 supports connectivity to repository 1080 and input resource 1092.

Computer readable storage medium 1012 (computer readable storage hardware) can be any hardware storage device such as memory, optical storage, hard drive, floppy disk, etc. In one example, the computer readable storage medium 1012 stores instructions and/or data.

As shown, computer readable storage media 1012 can be encoded with media playback application 140-1 (e.g., including instructions) to carry out any of the operations as discussed herein.

During operation of one example, processor 1013 accesses computer readable storage media 1012 via the use of interconnect 1011 in order to launch, run, execute, interpret or otherwise perform the instructions in media playback application 140-1 (such as executed by the playback manager 140, playback manager 145, processing resource 122 etc.) stored on computer readable storage medium 1012. Execution of the media playback application 140-1 produces media playback process 140-2 to carry out any of the operations and/or processes as discussed herein.

Those skilled in the art will understand that the computer system 1050 can include other processes and/or software and hardware components, such as an operating system that controls allocation and use of hardware resources to execute media playback application 140-1.

In accordance with different examples, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIGS. 11 and 12. Note that the steps in the flowcharts below can be executed in any suitable order.

Figure 11:
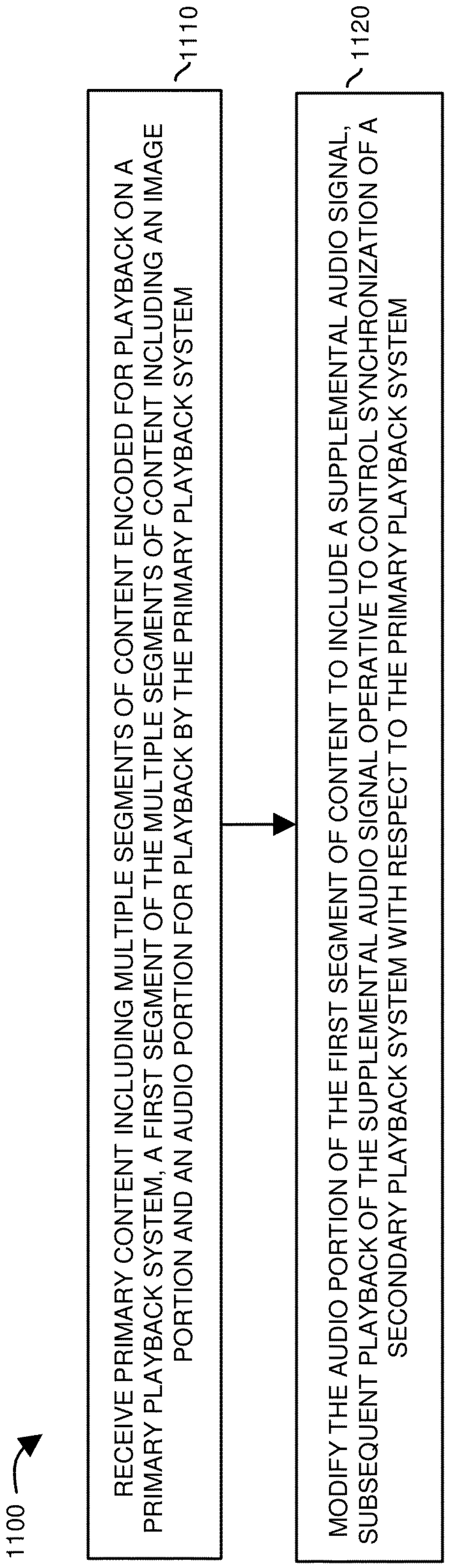
FIG. 11 is an example diagram illustrating a method as discussed herein.

FIG. 11 is a flowchart 1100 illustrating an example method according to examples. Note that there will be some overlap with respect to concepts as discussed above.

In processing operation 1110, a processing resource receives primary content including multiple segments of content encoded for playback on a primary playback system, where a first segment of the multiple segments of content includes an image portion and an audio portion for playback by the primary playback system.

In processing operation 1110 the processing resource modifies the audio portion or other portion of the first segment of content to include a supplemental signal, where subsequent playback of the supplemental signal is operative to control synchronization of a secondary playback system with respect to the primary playback system.

Figure 12:
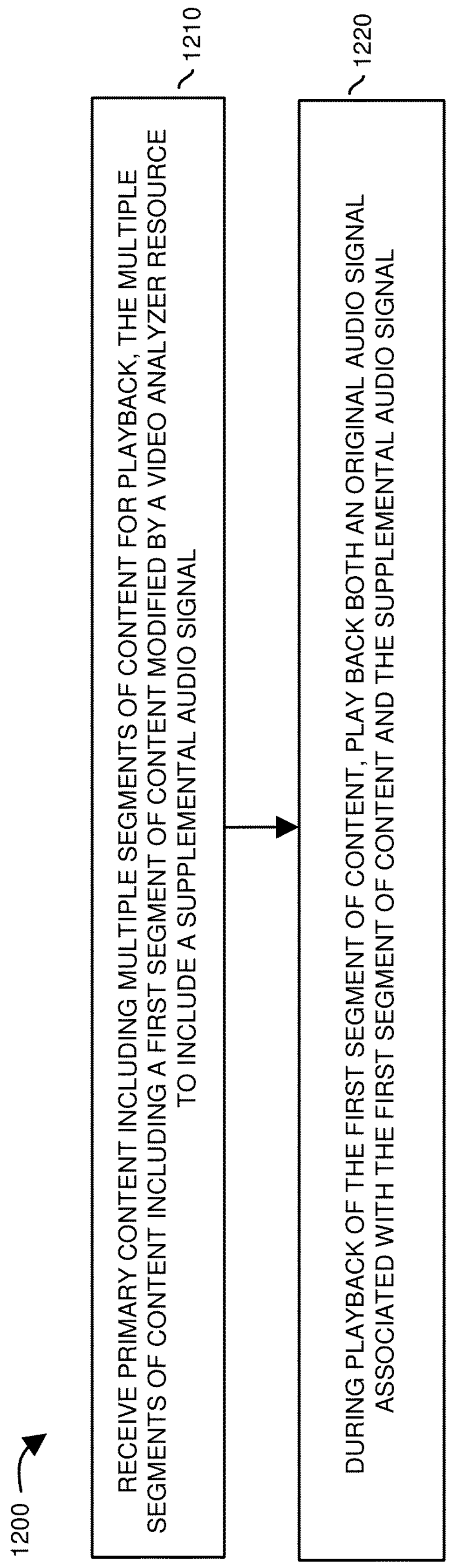
FIG. 12 is an example diagram illustrating a method as discussed herein.

FIG. 12 is a flowchart 1200 illustrating an example method according to examples. Note that there will be some overlap with respect to concepts as discussed above.

In processing operation 1210, primary playback system receives primary content including multiple segments of content for playback, where the multiple segments of content include a first segment of content modified by a video analyzer resource to include a supplemental signal.

In processing operation 1220, during playback of the first segment of content, the primary playback system plays back both an original audio signal associated with the first segment of content and the supplemental signal. As previously discussed, the playback of the supplemental signal support synchronization of the secondary playback system 152 playing back the supplemental media 120-S with respect to the primary playback system 151 playing back the primary content 120.

Note again that techniques herein are well suited to facilitate synchronization and re-synchronization of playing back supplemental media associated with playback of primary content. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

I claim:

1. A method comprising:

at a video analyzer resource:

receiving primary content including multiple segments of content encoded for playback on a primary playback system, a first segment of the multiple segments of content including an image portion and an audio portion for playback by the primary playback system; and modifying the audio portion of the first segment of content to include a supplemental audio signal, subsequent playback of the supplemental audio signal operative to control synchronization of a secondary playback system with respect to the primary playback system.

2. The method as in claim 1, wherein the audio portion of the first segment of content includes an original audio signal prior to the modifying;

wherein modifying the audio portion of the first segment of content includes: producing the modified audio portion of the first segment of content to include a combination of the original audio signal and the supplemental audio signal for playback by the primary playback system;

wherein the original audio signal is encoded via at least one audible frequency that is audibly detectable by a user operating the primary playback system; and wherein the supplemental audio signal is encoded via at least one frequency that is not audibly detectable by the user operating the primary playback system.

3. The method as in claim 1, wherein modifying the audio portion of the first segment of content to include the supplemental audio signal includes encoding the supplemental audio signal to play back at an audible frequency greater than a threshold of human hearing.

4. The method as in claim 1 further comprising:

at the video analyzer resource:

receiving advertisement information indicating timing associated with playback of a first advertisement amongst the multiple segments of content in the primary content;

via the advertisement information, detecting that the first advertisement is scheduled for playback between the first segment of the multiple segments of content and a second segment of the multiple segments of content; and modifying the audio portion of the first segment of content in response to detecting that the first advertisement is scheduled for playback between the first segment and the second segment of the multiple segments of content.

5. The method as in claim 4, wherein playback of the supplemental audio signal in the modified audio portion of the first segment of content indicates a start time of the first advertisement.

6. The method as in claim 5, wherein the supplemental audio signal is a first supplemental audio signal, the method further comprising:

modifying an audio portion of the second segment of content to include a second supplemental audio signal, where playback of the second supplemental audio signal is operative to control synchronization of the secondary playback system with respect to the primary playback system.

7. The method as in claim 6, wherein playback of the second supplemental audio signal in the audio portion of the second segment of content indicates a stop time of the first advertisement.

8. The method as in claim 1, wherein the secondary playback system is configured to playback secondary content, the secondary content including an audio description of images encoded for playback in the primary content.

9. The method as in claim 8, wherein the synchronization of the secondary playback system with respect to the primary playback system includes: synchronization of playback of the audio description of images on the secondary playback system with respect to playback of the primary content on the primary playback system.

10. The method as in claim 1 further comprising:

at the video analyzer resource:

receiving advertisement information indicating timing associated with playback of a first advertisement amongst the multiple segments of content in the primary content; and modifying the audio portion of the first segment of content to include the supplemental audio signal based on timing information associated with the first advertisement as indicated by the advertisement information.

11. The method as in claim 10, wherein the subsequent playback of the supplemental audio signal is operative to control the secondary playback system to discontinue playing back secondary content synchronized with playback of the first content by the primary playback system.

12. The method as in claim 1, wherein the subsequent playback of the supplemental audio signal is operative to notify the secondary playback system to resume playing back secondary content after a pause by the secondary playback system playing back the secondary content, the subsequent playback of the supplemental audio signal including transmission of the supplemental audio signal as a respective audible signal to the secondary playback system.

13. The method as in claim 1, wherein the subsequent playback of the supplemental audio signal by the primary playback system is operative to temporarily control the secondary playback system to pause playing back of secondary content.

14. The method as in claim 1, wherein the supplemental audio signal is a unique audio tone indicating timing associated with playback of an advertisement on the primary playback system.

15. The method as in claim 1, wherein the subsequent playback of the supplemental audio signal included in the modified audio portion of the first segment of content is operative to notify the secondary playback system of a scheduled playback operation associated with the primary playback system playing back the primary content.

16. The method as in claim 1, wherein the secondary playback system is operative to monitor for playback of the supplemental audio signal by the primary playback system to control a playback operation by the secondary playback system.

17. The method as in claim 1, wherein the supplemental audio signal is encoded to include a synchronization control command, the synchronization control command including at least one data bit, the synchronization control command indicating how to control operation of the secondary playback system playing back secondary content.

18. A system comprising:

communication management hardware operative to:

receive primary content including multiple segments of content encoded for playback on a primary playback system, a first segment of the multiple segments of content including an image portion and an audio portion for playback by the primary playback system; and modify the audio portion of the first segment of content to include a supplemental audio signal, subsequent playback of the supplemental audio signal operative to control synchronization of a secondary playback system with respect to the primary playback system.

19. The system as in claim 18, wherein the audio portion of the first segment of content includes an original audio signal prior to the modifying;

wherein the communication management hardware is further operative to: produce the modified audio portion of the first segment of content to include a combination of the original audio signal and the supplemental audio signal for playback by the primary playback system;

wherein the original audio signal is encoded via at least one audible frequency that is audibly detectable by a user operating the primary playback system; and wherein the supplemental audio signal is encoded via at least one frequency that is not audibly detectable by the user operating the primary playback system.

20. The system as in claim 18, wherein the communication management hardware is further operative to: encode the supplemental audio signal to play back at an audible frequency greater than a threshold of human hearing.

21. The system as in claim 18, wherein the communication management hardware is further operative to:

receive advertisement information indicating timing associated with playback of a first advertisement amongst the multiple segments of content in the primary content;

via the advertisement information, detect that the first advertisement is scheduled for playback between the first segment of the multiple segments of content and a second segment of the multiple segments of content; and modify the audio portion of the first segment of content in response to detecting that the first advertisement is scheduled for playback between the first segment and the second segment of the multiple segments of content.

22. The system as in claim 21, wherein playback of the supplemental audio signal in the modified audio portion of the first segment of content indicates a start time of the first advertisement.

23. The system as in claim 22, wherein the supplemental audio signal is a first supplemental audio signal; and wherein the communication management hardware is further operative to:

modify an audio portion of the second segment of content to include a second supplemental audio signal, where playback of the second supplemental audio signal is operative to control synchronization of the secondary playback system with respect to the primary playback system.

24. The system as in claim 23, wherein playback of the second supplemental audio signal in the audio portion of the second segment of content indicates a stop time of the first advertisement.

25. A method comprising:

receiving primary content including multiple segments of content encoded for playback on a primary playback system, a first segment of the multiple segments of content including an image portion and an audio portion for playback by the primary playback system;

modifying the first segment of content to include a supplemental command signal for playback by the primary playback system, the playback of the supplemental command signal by the primary playback system including audible transmission of the supplemental command signal; and wherein a secondary playback system is operative to receive the audible transmission of the supplemental command signal and control synchronization of the secondary playback system with respect to the primary playback system based upon execution of the supplemental command signal by the secondary playback system.

26. A method comprising:

at a primary playback system:

receiving primary content including multiple segments of content for playback, the multiple segments of content including a first segment of content modified by an analyzer resource to include a supplemental synchronization control signal; and during playback of the first segment of content by the primary playback system, audibly playing back both an original audio signal associated with the first segment of content and the supplemental synchronization control signal, the audible playback of the supplemental synchronization control signal by the primary playback system operative to synchronize a secondary playback system with the primary playback system based on execution of the synchronization control signal by the secondary playback system.

27. The method as in claim 26, wherein the supplemental synchronization control signal is a supplemental audio signal;

wherein playback of the first segment of content on the primary playback system includes:

audibly playing back an audio portion of the first segment of content via a sound generating system, the audio portion encoded to include the original audio signal and the supplemental audio signal; and visually playing back an image portion of the first segment of content on a display screen of the primary playback system, the image portion encoded to include images associated with the first segment of content.

28. The method as in claim 27, wherein the playback of the original audio signal via the sound generating system of the primary playback system is audibly detectable by a user operating the primary playback system; and wherein the played back supplemental audio signal by the sound generating system is not audibly detectable by the user operating the primary playback system.

29. The method as in claim 26, wherein the played back supplemental synchronization control signal is generated at an audible frequency greater than a threshold of human hearing.

30. The method as in claim 26, wherein the multiple segments of content include a second segment of content; and wherein the supplemental synchronization control signal associated with the first segment of content indicates timing of playing back a first advertisement played back on the primary playback system, the first advertisement scheduled for playback on the primary playback system between playback of the first segment of content and the second segment of content.

31. The method as in claim 30, wherein the supplemental synchronization control signal in the audio portion of the first segment of content is encoded to notify the secondary playback system of a start time of the first advertisement.

32. The method as in claim 31, wherein the supplemental synchronization control signal is a first supplemental audio signal; and wherein an audio portion of the second segment of content is modified to include a second supplemental audio signal, where playback of the second supplemental audio signal by the primary playback system is operative to control synchronization of the secondary playback system with respect to the primary playback system.

33. The method as in claim 32, wherein playback of the second supplemental audio signal indicates a stop time of the first advertisement.

34. The method as in claim 26, wherein the playback of the supplemental synchronization control signal by the primary playback system is operative to control synchronization of the secondary playback system playing back secondary content, the secondary content including an audio description of images associated with the primary content played back on the primary playback system.

35. The method as in claim 26, wherein the supplemental audio signal is encoded to include timestamp information indicating a current playback location of the first playback system playing back the primary content.

* * * * *